US007054286B2

(12) United States Patent
Ertel et al.

(10) Patent No.: US 7,054,286 B2

(45) Date of Patent: May 30, 2006

(54) BANDWIDTH ALLOCATION AND DATA MULTIPLEXING SCHEME FOR DIRECT SEQUENCE CDMA SYSTEMS

(75) Inventors: Richard B. Ertel, Midvale, UT (US); Eric K. Hall, Holliday, UT (US); Thomas R. Giallorenzi, Riverton, UT (US); Philip L. Stephenson, Salt Lake City, UT (US); Johnny M. Harris, Centerville, UT (US); Edward P. Newren, Woods Cross, UT (US)

(73) Assignee: L-3 Communications Corporation, New York, NY (US)

( * ) Notice: Subject to any disclaimer, the term of this patent is extended or adjusted under 35 U.S.C. 154(b) by 790 days.

(21) Appl. No.: 09/829,092

(22) Filed: Apr. 9, 2001

(65) Prior Publication Data

US 2002/0051462 A1 May 2, 2002

Related U.S. Application Data

(60) Provisional application No. 60/243,807, filed on Oct. 27, 2000.

(51) Int. Cl.
*H04Q 7/00* (2006.01)

(52) U.S. Cl. ...................................... 370/329; 370/335

(58) Field of Classification Search ................ 370/335, 370/329, 342, 431, 437, 468, 441, 330, 319, 370/522, 353; 375/130, 161; 455/517, 503, 455/450

See application file for complete search history.

(56) References Cited

U.S. PATENT DOCUMENTS

| | | | | |
|---|---|---|---|---|
| 6,005,852 | A * | 12/1999 | Kokko et al. | 370/329 |
| 6,219,343 | B1 * | 4/2001 | Honkasalo et al. | 370/335 |
| 6,289,228 | B1 * | 9/2001 | Rotstein et al. | 455/574 |
| 6,496,497 | B1 * | 12/2002 | Lee et al. | 370/342 |
| 6,512,784 | B1 * | 1/2003 | Schilling | 375/141 |
| 6,628,611 | B1 * | 9/2003 | Mochizuki | 370/229 |
| 6,697,348 | B1 * | 2/2004 | Chen et al. | 370/337 |
| 6,788,664 | B1 * | 9/2004 | Thomas et al. | 370/336 |

* cited by examiner

*Primary Examiner*—Hassan Kizcj
*Assistant Examiner*—Ricardo Pizarro
(74) *Attorney, Agent, or Firm*—Harrington & Smith, LLP

(57) ABSTRACT

This invention provides a highly flexible multiplexing scheme for Direct Sequence CDMA systems enabling the CDMA system to flexibly allocate CDMA channel resources between packet-switched broadcast channels and fast-circuit-switched dedicated channels in order to optimize system throughput. A method and system are provided for operating a communication system. The method has steps of: flexibly allocating CDMA channel resources between packet-switched broadcast channels and fast-circuit-switched dedicated channels in order to optimize system throughput, and employing a side channel as required to send all or a part of a total amount of data, depending on the total amount of the data. A bandwidth allocation scheme allocates a set of CDMA channels for burst packet-switched channels, and data is time division multiplexed over the set of burst CDMA channels providing a wide bandwidth data pipe for packet-switched data. Subscriber stations are equipped with multiple CDMA channel receivers tuned to the burst CDMA channels.

8 Claims, 4 Drawing Sheets

| | MODULATION AND CHANNEL CODING | | |
|---|---|---|---|
| PARAMETER | QPSK w/R=4/5 CODING (1.6 BITS/SYM) | 16–QAM w/R=4/5 CODING (3.2 BITS/SYM) | 64–QAM w/R=4/5 CODING (4.8 BITS/SYM) |
| RF CHANNEL BANDWIDTH | 3.5 MHz | 3.5 MHz | 3.5 MHz |
| CHIP RATE | 2.56 Mcps | 2.56 Mcps | 2.56 Mcps |
| COMMUNICATION CHANNEL BANDWIDTH | 4.096 Mbps | 8.192 Mbps | 12.288 Mbps |
| PEAK DATA RATE | 4.096 Mbps | 8.192 Mbps | 12.288 Mbps |
| CDMA CHANNEL BANDWIDTH (SF=1) | 4.096 Mbps | 8.192 Mbps | 12.288 Mbps |
| CDMA CHANNEL BANDWIDTH (SF=16) | 256 kbps | 512 kbps | 768 kbps |
| CDMA CHANNEL BANDWIDTH (SF=128) | 32 kbps | 64 kbps | 96 kbps |
| MODULATION FACTOR | 1.17 bps/Hz | 2.34 bps/Hz | 3.511 bps/Hz |

FIG.4

| | QPSK | | 16 QAM | | 64 QAM | |
|---|---|---|---|---|---|---|
| NUMBER OF ELEMENTS | AGGREGATE CAPACITY (Mbps) | MODULATION FACTOR | AGGREGATE CAPACITY (Mbps) | MODULATION FACTOR | AGGREGATE CAPACITY (Mbps) | MODULATION FACTOR |
| 1 | 4.096 | 1.17 | 8.192 | 2.34 | 12.288 | 3.511 |
| 2 | 8.192 | 2.34 | 16.384 | 4.68 | 24.576 | 7.022 |
| 4 | 16.384 | 4.68 | 32.768 | 9.36 | 49.152 | 14.044 |
| 8 | 32.768 | 9.36 | 65.536 | 18.72 | 98.304 | 28.088 |
| 16 | 65.536 | 18.72 | 131.072 | 37.44 | 196.608 | 56.176 |

FIG.5

BANDWIDTH ALLOCATION AND DATA MULTIPLEXING SCHEME FOR DIRECT SEQUENCE CDMA SYSTEMS

CLAIM OF PRIORITY FROM COPENDING PROVISIONAL PATENT APPLICATION

This patent application claims priority from U.S. Provisional Patent Application No.: 60/243,807, filed on Oct. 27, 2000, the disclosure of which is incorporated by reference herein in its entirety.

FIELD OF THE INVENTION

This invention relates generally to wireless communications systems and methods, and relates in particular to Code Division Multiple Access (CDMA) systems that operate with both packet-switched and circuit switched services.

BACKGROUND OF THE INVENTION

For a Direct Sequence CDMA system an optimum type of connection is dependent upon the user's bandwidth demand behavior. For fixed rate bandwidth requirements, such as standard telephone connections, fast circuit switched connections are preferable to packet-switched connections that require routing overhead in each packet. For these types of connections the routing overhead can quickly exceed the one time channel setup overhead required of circuit switched connections. In contrast, for bursty data connections, such as those required for internet connections, packet-switched connections result in less connection overhead, since the routing overhead required to send just a few packets of data can be much smaller than the initial channel setup overhead required for circuit switched connections.

It can thus be appreciated that there is a need for a data multiplexing scheme that allows for both packet-switched and circuit switched connections to exist simultaneously in a single CDMA system, with a flexible amount of channel bandwidth allocated to each connection type.

SUMMARY OF THE INVENTION

This invention provides a highly flexible multiplexing scheme for Direct Sequence CDMA systems enabling the CDMA system to flexibly allocate CDMA channel resources between packet-switched broadcast channels and fast-circuit-switched dedicated channels in order to optimize system throughput.

A method and system are provided for operating a communication system. The method includes steps of: flexibly allocating CDMA channel resources between packet-switched broadcast channels and fast-circuit-switched dedicated channels in order to optimize system throughput, and employing a side channel as required to send all or a part of a total amount of data, depending on the total amount of the data. A bandwidth allocation scheme allocates a set of CDMA channels for burst packet-switched channels, and data is time division multiplexed over the set of burst CDMA channels providing a wide bandwidth data pipe for packet-switched data. Subscriber stations are equipped with multiple CDMA channel receivers tuned to the burst CDMA channels.

A synchronous CDMA communication system in accordance with these teachings includes a base site (BS) that communicates with subscriber stations (SSs) through a radio channel. The system has a BS channel allocation control unit for allocating radio channel bandwidth so as to include a set of shared forward link CDMA channels for use as burst packet-switched channels, where data is time division multiplexed over the burst packet-switched channels to a plurality of the SSs. The system further includes multiple CDMA burst packet-switched channel receivers at individual ones of the plurality of SSs for receiving data from the burst packet-switched channels. The BS channel allocation control unit further allocates, as required, other CDMA channels for circuit-switched connections to particular ones of the SSs. A side CDMA channel is also provided for making channel requests and for sending all or a part of the total amount of data, depending on the total amount of the data. For a SS that has data to transmit to the BS, the SS may transmits an indication to the BS that the SS has data to be transmitted, along with the data.

The BS channel allocation control unit may further allocate a set of shared reverse link CDMA channels for use as burst packet-switched channels. In this case individual ones of the SSs further include multiple CDMA burst packet-switched channel transmitters that are used in a contention mode, e.g., in a slotted Aloha mode, by a number of the SSs to transmit channel requests alone, channel requests along with data, or data alone to the BS.

In the presently preferred embodiment of these teachings a plurality of SSs can be assigned to a same forward link data side channel, and in this case packet multiplexing is used to transmit data packets from the BS to individual ones of the plurality of SSs that are assigned to the same forward data side channel.

BRIEF DESCRIPTION OF THE DRAWINGS

The above set forth and other features of the invention are made more apparent in the ensuing Detailed Description of the Invention when read in conjunction with the attached Drawings, wherein:

FIG. 4 is a Table illustrating exemplary parameters for a 3.5 MHz RF channelization;

FIG. 5 is a Table depicting an aggregate capacity and modulation factors versus modulation type and array size.

DETAILED DESCRIPTION OF THE INVENTION

Figure 1:
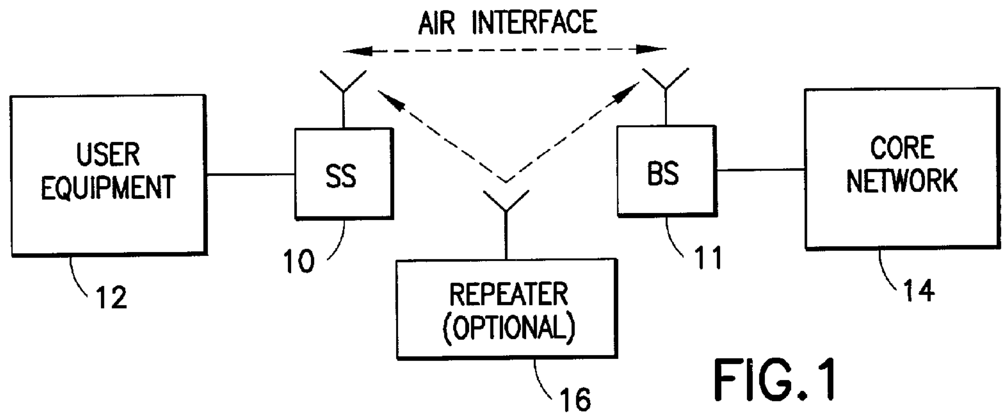
FIG. 1 is simplified block diagram of a wireless access reference model that pertains to the teachings of this invention.

Disclosed herein is a PHY system intended for IEEE 802.16.3 and related standards, although those having skill in the art should realize that various aspects of these teachings have wider applicability.

The technique is based on a hybrid synchronous DS-CDMA (S-CDMA) and FDMA scheme using quadrature amplitude modulation (QAM) and trellis coding. For a general background and benefits of S-CDMA with trellis-coded QAM one may refer to R. De Gaudenzi, C. Elia and R. Viola, "Bandlimited Quasi-Synchronous CDMA: A Novel Satellite Access Technique for Mobile and Personal Communication Systems," IEEE Journal on Selected Areas in Communications, Vol. 10, No. 2, February 1992, pp. 328–343, and to R. De Gaudenzi and F. Gianneti, "Analysis and Performance Evaluation of Synchronous Trellis-Coded CDMA for Satellite Applications," IEEE Transactions on Communications, Vol. 43, No. 2/3/4, February/March/April 1995, pp. 1400–1409.

The ensuing description focuses on a frequency division duplexing (FDD) mode. While a time division duplexing (TDD) mode is also within the scope of these teachings, the TDD mode is not discussed further.

What follows is an overview of the PHY teachings in accordance with this invention.

The system provides synchronous direct-sequence code division multiple access (DS-CDMA) for both upstream (reverse link or subscriber station (SS) 10 to base station or base site (BS) 11) and downstream transmissions (forward link or BS 11 to SS 10). The system further provides spread RF channel bandwidths from 1.75–7 MHz, depending on target frequency band, and a constant chip rate from 1–6 Mcps (Million chips per second)within each RF sub-channel with common I-Q spreading. The chip rate depends on channelization of interest (e.g. 3.5 MHz or 6 MHz). The system features orthogonal, variable-length spreading codes using Walsh-Hadamard designs with spread factors (SF) of 1, 2, 4, 8, 16, 32, 64 and 128 chips/symbol being supported, and also features unique spreading code sets for adjacent, same-frequency cells/sectors. Upstream and downstream power control and upstream link timing control are provided, as are single CDMA channel data rates from 32 kbps up to 16 Mbps depending on SF (spreading factor) and chip rate. In the preferred system S-CDMA channel aggregation is provided for the highest data rates.

Furthermore, in the presently preferred embodiment FDMA is employed for large bandwidth allocations with S-CDMA in each FDMA sub-channel, and S-CDMA/FDMA channel aggregation is used for the higher data rates. Code, frequency and/or time division multiplexing is employed for both upstream and downstream transmissions. Frequency division duplex (FDD) or time division duplex (TDD) can be employed, although as stated above the TDD mode of operation is not described further. The system features coherent QP SK and 16-QAM modulation with optional support for 64-QAM. End-to-end raised-cosine Nyquist pulse shape filtering is employed, as is adaptive coding, using high-rate punctured, convolutional coding (K=7) and/or Turbo coding (rates of 4/5, 5/6 and 7/8 are typical). Data randomization using spreading code sequences is employed, as is linear equalization in the downstream with possible transmit pre-equalization for the upstream. Also featured is the use of space division multiple access (SDMA) using adaptive beamforming antenna arrays (1 to 16 elements possible) at the base station or base site 11.

FIG. 1 shows the wireless access reference model per the IEEE 802.16.3 FRD (see IEEE 802.16.3-00/02r4, "Functional Requirements for the 802.16.3 Interoperability Standard."). Within this model, the PHY technique in accordance with these teachings provides access between one or more subscriber stations (SS) 10 and base stations (BS) 11 to support the user equipment 12 and core network 14 interface requirements. An optional repeater 16 may be deployed.

Figure 2:
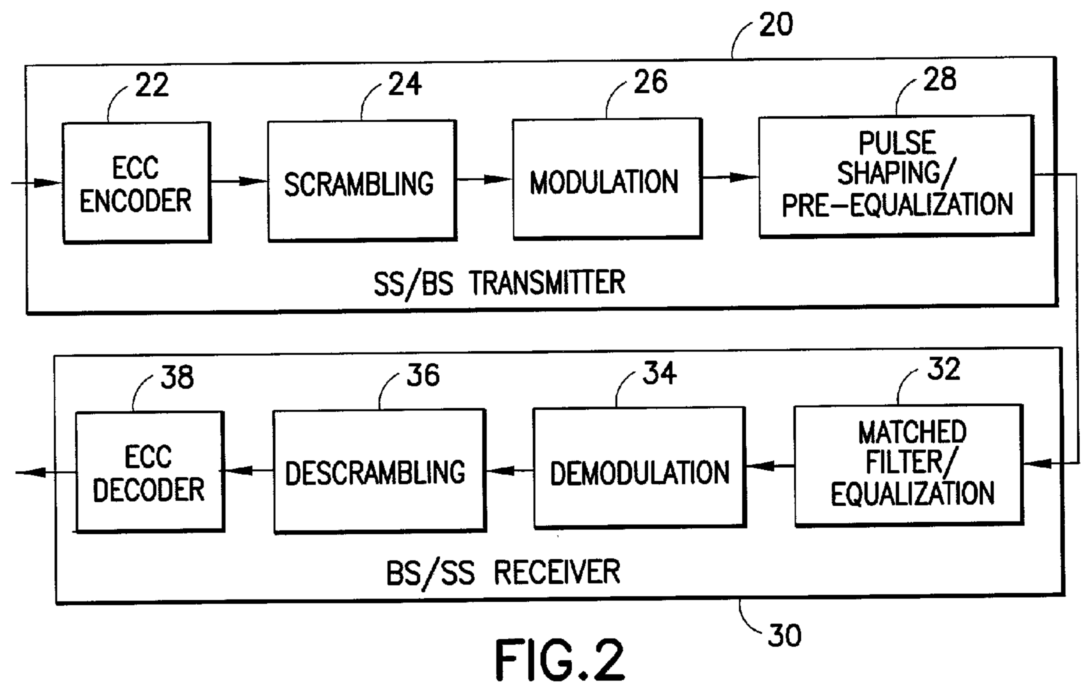
FIG. 2 is block diagram of a physical (PHY) system reference model showing a major data flow path.

In FIG. 2, the PHY reference model is shown. This reference model is useful in discussing the various aspects of the PHY technique. As is apparent, the SS 10 and BS 11 transmission and reception equipment may be symmetrical. In a transmitter 20 of the BS 11 or the SS 10 there is an Error Control Coding (ECC) encoder 22 for incoming data, followed by a scrambling block 24, a modulation block 26 and a pulse shaping/pre-equalization block 28. In a receiver 30 of the BS 11 or the SS 10 there is a matched filter/equalization block 32, a demodulation block 34, a descrambling block 36 and an ECC decoder 38. These various components are discussed in further detail below.

The PHY interfaces with the Media Access Control (MAC) layer, carrying MAC packets and enabling MAC functions based on Quality of Service (QoS) requirements and Service Level Agreements (SLAs). As a S-CDMA system, the PHY interacts with the MAC for purposes of power and timing control. Both power and timing control originate from the BS 11, with feedback from the SS 10 needed for forward link power control. The PHY also interacts with the MAC for link adaptation (e.g. bandwidth allocation and SLAs), allowing adaptation of modulation formats, coding, data multiplexing, etc.

With regard to frequency bands and RF channel bandwidths, the primary frequency bands of interest for the PHY include the ETSI frequency bands from 1–3 GHz and 3–11 GHz as described in ETSI EN 301 055, Fixed Radio Systems; Point-to-multipoint equipment; Direct Sequence Code Division Multiple Access (DS-CDMA); Point-to-point digital radio in frequency bands in the range 1 GHz to 3 GHz, and in ETSI EN 301 124, Transmission and Multiplexing (TM); Digital Radio Relay Systems (DRRS); Direct Sequence Code Division Multiple Access (DS-CDMA) point-to-multipoint DRRS in frequency bands in the range 3 GHz to 11 GHz, as well as with the MMDS/MDS (digital TV) frequency bands. In ETSI EN 301 124, the radio specifications for DS-CDMA systems in the fixed frequency bands around 1.5, 2.2, 2.4 and 2.6 GHz are given, allowing channelizations of 3.5, 7, 10.5 and 14 MHz. Here, the Frequency Division Duplex (FDD) separation is specific to the center frequency and ranges from 54 to 175 MHz. In ETSI EN 301 124, Transmission and Multiplexing (TM); Digital Radio Relay Systems (DRRS); Direct Sequence Code Division Multiple Access (DS-CDMA) point-to-multipoint DRRS in frequency bands in the range 3 GHz to 11 GHz. , the radio characteristics of DS-CDMA systems with fixed frequency bands centered around 3.5, 3.7 and 10.2 GHz are specified, allowing channelizations of 3.5, 7, 14, 5, 10 and 15 MHz. Here, FDD separation is frequency band dependant and ranges from 50 to 200 MHz. Also of interest to these teachings are the MMDS/ITSF frequency bands between 2.5 and 2.7 GHz with 6 MHz channelizations.

With regard to multiple access, duplexing and multiplexing, the teachings herein provide a frequency division duplex (FDD) PHY using a hybrid S-CDMA/FDMA multiple access scheme with SDMA for increased spectral efficiency. In this approach, a FDMA sub-channel has an RF channel bandwidth from 1.75 to 7 MHz. The choice of FDMA sub-channel RF channel bandwidth is dependent on the frequency band of interest, with 3.5 MHz and 6 MHz being typical per the IEEE 802.16.3 FRD. Within each FDMA sub-channel, S-CDMA is used with those users transmitting in the upstream and downstream using a constant chipping rate from 1 to 6 Mchips/second. While TDD could be used in a single RF sub-channel, this discussion is focused on the FDD mode of operation. Here, FDMA sub-channel(s) are used in the downstream while at least one FDMA sub-channel is required for the upstream. The approach is flexible to asymmetric data traffic, allowing more downstream FDMA sub-channels than upstream FDMA sub-channels when traffic patterns and frequency allocation warrant. Based on existing frequency bands, typical upstream/downstream FDMA channel separations range from 50 to 200 MHz.

Turning now to the Synchronous DS-CDMA (S-CDMA) aspects of these teachings, within each IFDMA sub-channel, S-CDMA is used in both the upstream and the downstream directions. The chipping rate is constant for all SS with rates ranging from 1 to 6 Mchips/second depending on the FDMA RF channel bandwidth. Common I-Q spreading is performed using orthogonal, variable-length spreading codes based on Walsh-Hadamard designs with spread factors ranging from 1 up to 128 chips per symbol (see, for example, E. Dinan and G. Jabbari, "Spreading Codes for Direct Sequence CDMA and Wideband CDMA Cellular Networks," IEEE Communications Magazine, September 1998, pp. 48–54. For multi-cell deployments with low frequency reuse, unique spreading code sets are used in adjacent cells to minimize interference.

It should be noted that an aspect of these teachings is a symmetric waveform within each FDMA sub-channel, where both the upstream and downstream utilize the same chipping rate (and RF channel bandwidth), spreading code sets, modulation, channel coding, pulse-shape filtering, etc.

Referring now to Code and Time Division Multiplexing and channel aggregation, with a hybrid S-CDMA/FDMA system it is possible to multiplex data over codes and frequency sub-channels. Furthermore, for a given code or frequency channel, time division multiplexing could also be employed. In the preferred approach, the following multiplexing scheme is employed.

For the downstream transmission with a single FDMA sub-channel, the channel bandwidth (i.e. capacity measured in bits/second) is partitioned into a single TDM pipe and multiple CDM pipes. The TDM pipe may be created via the aggregation of multiple S-CDMA channels. The purpose of this partition is based on the desire to provide Quality of Service (QoS). Within the bandwidth partition, the TDM pipe would be used for best effort service (BES) and for some assured forwarding (AF) traffic. The CDM channels would be used for expedited forwarding (EF) services, such as VoIP connections or other stream applications, where the data rate of the CDM channel is matched to the bandwidth requirement of the service.

The downlink could be configured as a single TDM pipe. In this case a time slot assignment may be employed for bandwidth reservation, with typical slot sizes ranging from 4–16 ms in length. While a pure TDM downlink is possible in this approach, it is preferred instead to employ a mixed TDMWCDM approach. This is so because long packets can induce jitter into EF services in a pure TDM link. Having CDMA channels (single or aggregated) dedicated to a single EF service (or user) reduces jitter without the need for packet fragmentation and reassembly. Furthermore, these essentially "circuit-switched" CDM channels would enable better support of legacy circuit-switched voice communications equipment and public switched telephone networks.

For the upstream, the preferred embodiment employs a similar partition of TDM(CMD channels. The TDM channel(s) would be used for random access, using a slotted-Aloha protocol. In keeping with a symmetric waveform, recommended burst lengths are on the order of the slot times for the downlink, ranging from 4–16 ms. Multi-slot bursts are possible. The BS 11 monitors bursts from the SS 10 and allocates CDMA channels to SSs upon recognition of impending bandwidth requirements or based on service level agreements (SLAs). As an example, a BS 11 recognizing the initiation of a VoIP connection could move the transmission to a dedicated CDMA channel with a channel bandwidth of 32 kbps.

When multiple FDMA sub-channels are present in the upstream or downstream directions, similar partitioning could be used. Here, additional bandwidth exists which implies that more channel aggregation is possible. With a single TDM channel, data may be multiplexed across CDMA codes and across frequency sub-channels.

With regard now to Space Division Multiple Access (SDMA) extensions, a further aspect of this multiple access scheme involves the use of SDMA using adaptive beamforming antennas. Reference can be made to J. Liberti and T. Rappaport, *Smart Antennas for Wireless CDMA*, Prentice-Hall PTR, Upper Saddle River, N.J., 1997, for details of beamforming with CDMA systems.

In accordance with the teachings herein there is provided an adaptive antenna array at the BS 11, with fixed beam SS antennas. In this approach, S-CDMA/FDMA channels can be directed at individual SSs. The isolation provided by the beamforming allows the CDMA spreading codes to be reused within the same cell, greatly increasing spectral efficiency. Beamforming is best suited to CDM rather than TDM channels. In the downstream, TDM would employ beamforming on a per slot or burst basis, increasing complexity. In the upstream, beamforming would be difficult since the BS 11 would need to anticipate transmission from the SS in order to form the beams appropriately. In either case, reuse of CDMA spreading codes in a TDM-only environment would be difficult. With CDM, however, the BS 11 may allocate bandwidth (i.e. CDMA channels) to SS 10 based on need, or on SLAs. Once allocated, the BS 11 forms a beam to the SS 10 to maximize signal-to-interference ratios. Once the beam is formed, the BS 11 may allocate the same CDMA channel to one or more other SSs in the cell. It is theoretically possible for the spectral efficiency of the cell to scale linearly with the number of antennas in the BS array.

SDMA greatly favors the approach of "fast circuit-switching" over pure, TDM packet-switching in a CDMA environment. By "fast circuit-switching", what is implied is that packet data services are handled using dedicated connections, which are allocated and terminated based on bandwidth requirements and/or SLAs. An important consideration when providing effective packet-services using this approach lies in the ability of the BS 11 to rapidly determine bandwidth needs, and to both allocate and terminate connections rapidly. With fast channel allocation and termination, SDMA combined with the low frequency reuse offered by S-CDMA is a preferred option, in terms of spectral efficiency, for FWA applications.

A discussion is now made of waveform specifications. The waveform includes the channel coding 22, scrambling 24, modulation 26 and pulse shaping and equalization functions 28 of the air interface, as depicted in FIG. 2. Also included are waveform control functions, including power and timing control. In the presently preferred PHY, each CDMA channel (i.e. spreading code) uses a common waveform, with the spreading factor dictating the data rate of the channel.

With regard to the Error Control Coding (ECC) function 22 of FIG. 2, the ECC is preferably high-rate and adaptive. High rate codes are used to maximize the spectral efficiency of BWA systems using S-CDMA systems that are code-limited. In code-limited systems, the capacity is limited by the code set cardinality rather than the level of the multi-user interference. Adaptive coding is preferred in order to improve performance in multipath fading environments. For the coding options, and referring as well to FIG. 3, the baseline code is preferably a punctured convolutional code (CC). The constituent code may be the industry standard, rate 1/2, constraint length 7 code with generator $(\mathbf{133/171})_8$. Puncturing is used to increase the rate of the code, with rates of 3/4, 4/5, 5/6 or 7/8 supported using optimum free distance puncturing patterns. The puncturing rate of the code may be adaptive to mitigate fading conditions. For decoding (block 38 of FIG. 2), a Viterbi decoder is preferred. Reference in this regard can be made again to the above-noted publication R. De Gaudenzi and F. Gianneti, "Analysis and Performance Evaluation of Synchronous Trellis-Coded CDMA for Satellite Applications," IEEE Transactions on Communications, Vol. 43, No. 2/3/4, February/March/April 1995, pp. 1400–1409, for an analysis of trellis-coded S-CDMA.

Figure 3:
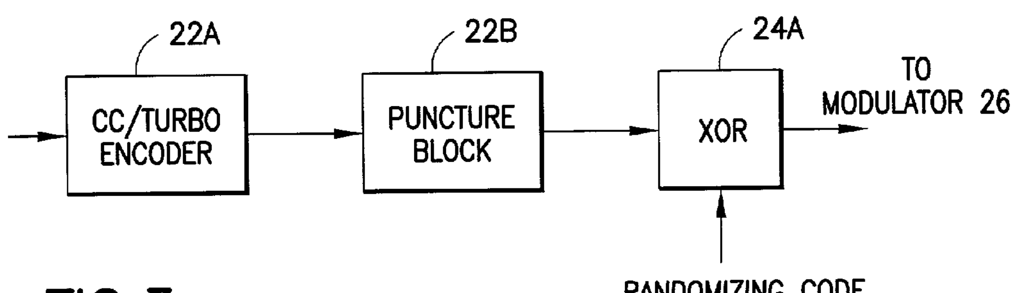
FIG. 3 shows an Error Control Coding (ECC) and scrambling technique for single CDMA channel.

Turbo coding, including block turbo codes and traditional parallel and serial concatenated convolutional codes, are preferably supported as an option at the rates suggested above. In FIG. 3, the CC/Turbo coding is performed in block 22A, the puncturing in block 22B, and the scrambling can be performed using an XOR 24A that receives a randomizing code.

Each CDMA channel is preferably coded independently. Independent coding of CDMA channels furthers the symmetry of the upstream and downstream waveform and enables a similar time-slot structure on each CDMA channel. The upstream and downstream waveform symmetry aids in cost reduction, as the SS 10 and BS 11 baseband hardware can be identical. The independent coding of each S-CDMA/FDMA channel is an important distinction between this approach and other multi-carrier CDMA schemes.

Randomization is preferably implemented on the coded bit stream. Rather than using a traditional randomizing circuit, it is preferred, as shown in FIG. 3, to use randomizing codes derived from the spreading sequences used by the transmitting station. Using the spreading codes allows different randomizing sequences to be used by different users, providing more robust randomization and eliminating problems with inter-user correlated data due to periodic sequences transmitted (e.g. preambles). Since the receiving station has knowledge of the spreading codes, derandomization is trivial. Randomization may be disabled on a per channel or per symbol basis. FIG. 3 thus depicts the preferred channel coding and scrambling method for a single CDMA channel.

With regard to the modulation block 26, both coherent QPSK and square 16-QAM modulation formats are preferably supported, with optional support for square 64-QAM. Using a binary channel coding technique, Gray-mapping is used for constellation bit-labeling to achieve optimum decoded performance. This combined coding and modulation scheme allows simple Viterbi decoding hardware designed for binary codes to be used. Differential detection for all modulation formats may be supported as an option. Depending on the channel coding, waveform spectral efficiencies from 1 to 6 information bits/symbol are realized.

The modulation format utilized is preferably adaptive based on the channel conditions and bandwidth requirements. Both upstream and downstream links are achievable using QPSK waveform provided adequate SNR. In environments with higher SNR, up and downstream links may utilize 16-QAM and /or 64-QAM modulation formats for increased capacity and spectral efficiency. The allowable modulation format depends on the channel conditions and the channel coding being employed on the link.

In the preferred embodiment end-to-end raised-cosine Nyquist pulse shaping is applied by block 28 of FIG. 2, using a minimum roll-off factor of 0.25. Pulse shape filtering is designed to meet relevant spectral masks, mitigate intersymbol interference (ISI) and adjacent FDMA channel interference.

To mitigate multipath fading, a linear equalizer 32 is preferred for the downstream. Equalizer training may be accomplished using a preamble, with decision-direction used following initial training. With S-CDMA, equalizing the aggregate signal in the downlink effectively equalizes all CDMA channels. Multipath delay spread of less than 3 μs is expected for Non-Line Of Sight (NLOS) deployments using narrow-beam (10–20°) subscriber station 10 antennas (see, for example, J. Porter and J. Thweat, "Microwave Propagation Characteristics in the MMDS Frequency Band," Proceedings of IEEE International Conf. On Communications (ICC) 2000, New Orleans, La., USA, June 2000, and V. Erceg, et al, "A Model for the Multipath Delay Profile of Fixed Wireless Channels," IEEE Journal on Selected Areas in Communications (JSAC), Vol. 17, No. 3, March 1999, pp. 399–410.

The low delay spread allows simple, linear equalizers with 8–16 taps that effectively equalize most channels. For the upstream, pre-equalization may be used as an option, but requires feedback from the subscriber station 10 due to frequency division duplexing.

Timing control is required for S-CDMA. In the downstream, timing control is trivial. However, in the upstream timing control is under the direction of the BS 11. Timing control results in reduced in-cell interference levels. While infinite in-cell signal to interference ratios are theoretically possible, timing errors and reduction in code-orthogonality from pulse shape filtering allows realistic signal to in-cell interference ratios from 30–40 dB. In asynchronous DS-CDMA (A-CDMA) systems, higher in-cell interference levels exist, less out-of-cell interference can be tolerated and higher frequency reuse is needed to mitigate out-of-cell interference(see, for example, T. Rappaport, *Wireless Communications: Principles and Practice*, Prentice-Hall PTR, Upper Saddle River, N.J., 1996, pp. 425–431. The ability of timing-control to limit in-cell interference is an important aspect of achieving a frequency reuse of one in a S-CDMA system.

Power control is also required for S-CDMA systems. Power control acts to mitigate in-cell and out-of-cell interference while also ensuring appropriate signal levels at the SS 10 or the BS 11 to meet bit error rate (BER) requirements. For a SS 10 close to the BS 11, less transmitted power is required, while for a distant SS 10, more transmit power is required in both the up and downstream. As with timing control, power control is an important aspect of achieving a frequency reuse of one.

Turning now to a discussion of capacity, spectral efficiency and data rates, for a single, spread FDMA channel, the presently preferred S-CDMA waveform is capable of providing channel bandwidths from 1 to 16 Mbps. Using variable-length spreading codes, each CDMA channel can be configured to operate from 32 kbps (SF=128) to 16 Mbps (SF=1), with rates depending on the modulation, coding and RF channel bandwidths. With S-CDMA channel aggregation, high data rates are possible without requiring a SF of one. In general, the use of S-CDMA along with the presently preferred interference mitigation techniques enable the system to be code-limited. Note, mobile cellular A-CDMA systems are always interference-limited, resulting in lower spectral efficiency. Recall also that in code-limited systems, the capacity is limited by the code set cardinality rather than the level of the multi-user interference. In a code-limited environment, the communications channel bandwidth of the system is equal to the communications channel bandwidth of the waveform, assuming a SF of one. In the Table shown in FIG. 4 sample parameters are shown for a hypothetical system using different coded modulation schemes and assuming a code-limited DS-CDMA environment. The Table of FIG. 4 illustrates potential performance assuming a single 3.5 MHz channel in both the upstream and downstream. The numbers reported apply to both the upstream and downstream directions, meaning that upwards of 24 Mbps full duplex is possible (12 Mbps upstream and 12 Mbps downstream). With additional FDMA RF channels or large RF channels (e.g. 6 MHz), additional communication bandwidth is possible with the same modulation factors from the Table. As an example, allocation of 14 MHz could be serviced using 4 FDMA RF channels with the parameters described in the Table of FIG. 4. At 14 MHz, peak data rates to a given SS 10 of up to 48 Mbps are achievable, with per-CDMA channel data rates scaling up from 32 kbps. The channel aggregation method in accordance with these teachings is very flexible in servicing symmetric versus asymmetric traffic, as well as for providing reserved bandwidth for QoS and SLA support.

With regard to multi-cell performance, to this point both the capacity and spectral efficiency have been discussed in the context of a single, isolated cell. In a multi-cell deployment, S-CDMA enables a true frequency reuse of one. With S-CDMA, there is no need for frequency planning, and spectral efficiency is maximized. With a frequency reuse of one, the total system spectral efficiency is equal to the modulation factor of a given cell. Comparing S-CDMA to a single carrier TDMA approach, with a typical frequency reuse of 4, TDMA systems must achieve much higher modulation factors in order to compete in terms of overall system spectral efficiency. Assuming no sectorization and a frequency reuse of one, S-CDMA systems can achieve system spectral efficiencies from 1 to 6 bps/Hz, with improvements being possible with SDMA.

While frequency reuse of one is theoretically possible for DS-CDMA, the true allowable reuse of a specific deployment is dependent on the propagation environment (path loss) and user distribution. For mobile cellular systems, it has been shown that realistic reuse factors range from 0.3 up to 0.7 for A-CDMA: factors that are still much higher than for TDMA systems. In a S-CDMA system, in-cell interference is mitigated by the orthogonal nature of the S-CDMA, implying that the dominant interference results from adjacent cells. For the fixed environments using S-CDMA, true frequency reuse of one can be achieved for most deployments using directional SS antennas and up and downstream power control to mitigate levels of adjacent cell interference. In a S-CDMA environment, true frequency reuse of one implies that a cell is code-limited, even in the presence of adjacent cell interference.

For sectorized deployments with S-CDMA, a frequency reuse of two is required to mitigate the interference contributed by users on sector boundaries. In light of this reuse issue, it is preferred to use SDMA with adaptive beamforming rather than sectorization to improve cell capacity.

Since spectral efficiency translates directly into cost, the possibility of a frequency reuse of one is an important consideration.

The use of SDMA in conjunction with S-CDMA offers the ability to dramatically increase system capacity and spectral efficiency. SDMA uses an antenna array at the BS 11 to spatially isolate same code SSs 10 in the cell. The number of times that a code may be reused within the same cell is dependent upon the number of antenna elements in the array, the array geometry, the distribution of users in the cell, the stability of the channel, and the available processing power. Theoretically, in the absence of noise, with an M element antenna array it is possible to reuse each code sequence M times, thereby increasing system capacity by a factor of M. In practice, the code reuse is slightly less than M due to implementation loss, frequency selective multipath fading, and receiver noise. Regardless, significant capacity gains are achievable with SDMA. With appropriate array geometry and careful grouping of users sharing CDMA codes, it is possible to achieve a code reuse of 0.9M or better.

In an actual deployment the number of antenna elements is limited by the available processing power, the physical tower constraints, and system cost (e.g. the number of additional RF front ends (RFFEs)). Selected array sizes vary depending upon the required capacity of the given cell on a cell-by-cell basis. The Table shown in FIG. 5 illustrates the achievable aggregate capacity and modulation factor with typical array sizes, assuming a code reuse equal to the number of antenna elements. The aggregate capacity is defined as the total data rate of the BS 11. Modulation factors exceeding 56 bps/Hz are achievable with 64 QAM and a sixteen-element antenna array. It should be noted that while SDMA increases the capacity of cell, it does not increase the peak data rate to a given SS 10.

The PHY system disclosed herein is very flexible. Using narrowband S-CDMA channels, the PHY system can adapt to frequency allocation, easily handling non-contiguous frequency allocations. The data multiplexing scheme allows great flexibility in servicing traffic asymmetry and support of traffic patterns created by higher-layer protocols such as TCP.

Deployments using the disclosed PHY are also very scalable. When traffic demands increase, new frequency allocation can be used. This involves adding additional FDMA channels, which may or may not be contiguous with the original allocation. Without additional frequency allocation, cell capacity can be increased using an adaptive antenna array and SDMA.

The high spectral efficiency of the disclosed waveform leads to cost benefits. High spectral efficiency implies less frequency bandwidth is required to provide a certain amount of capacity.

Using a symmetric waveform (i.e., a waveform that is the same in the upstream and downstream directions) is a cost saving feature, allowing the use of common baseband hardware in the SS 10 and the BS 11. The use of CDMA technology also aids in cost reduction, as some CDMA technology developed for mobile cellular applications may be applicable to gain economies of scale.

As a spread spectrum signal, the preferred waveform offers inherent robustness to interference sources. Interference sources are reduced by the spreading factor, which ranges from 1 to 128 (interference suppression of 0 to 21 dB.) At the SS 10, equalization further suppresses narrowband jammers by adaptively placing spectral nulls at the jammer frequency. Additional robustness to interference is achieved by the directionality of the SS antennas, since off-boresight interference sources are attenuated by the antenna pattern in the corresponding direction. At the BS 11, the antenna array used to implement SDMA offers the additional benefit of adaptively steering nulls towards unwanted interference sources.

The presently preferred waveform exhibits several properties that make it robust to channel impairments. The use of spread spectrum makes the waveform robust to frequency selective fading channels through the inherent suppression of inter-chip interference. Further suppression of inter-chip interference is provided by equalization at the SS 10. The waveform is also robust to flat fading channel impairments. The adaptive channel coding provides several dB of coding gain. The antenna array used to implement SDMA also functions as a diversity combiner. Assuming independent fading on each antenna element, diversity gains of M are achieved, where M is equal to the number of antenna elements in the array. Finally, since the S-CDMA system is code-limited rather than interference limited the system may run with a large amount of fade margin. Even without equalization or diversity, fade margins on the order of 10 dB are possible. Therefore, multipath fades of 10 dB or less do not increase the BER beyond the required level.

The adaptive modulation also provides some robustness to radio impairments. For receivers with larger phase noise, the QPSK modulation offers more tolerance to receiver phase noise and filter group delay. The adaptive equalizer at the SS 10 reduces the impact of linear radio impairments. Finally, the use of clipping to reduce the peak-to-average power ratio of the transmitter signal helps to avoid amplifier saturation, for a given average power output.

An important distinction between the presently preferred embodiment and a number of other CDMA approaches is the use of a synchronous upstream, which allows the frequency reuse of one. Due to some similarity with mobile cellular standards, cost savings are possible using existing, low-cost CDMA components and test equipment.

The presently preferred PHY is quite different from cable modem and xDSL industry standards, as well as existing IEEE 802.11 standards. However, with a spreading factor of one chip/symbol, the PHY supports a single-carrier QAM waveform similar to DOCSIS 1.1 and IEEE 802.16.1 draft PHY (see "Data-Over-Cable Service Interface Specifications: Radio Frequency Interface Specification", SP-RF1v1.1-I05-000714, and IEEE 802.16. 1-00/01r4, "Air Interface for Fixed Broadband Wireless Access Systems", September 2000.

The presently preferred PHY technique provides an optimum choice for IEEE 802.16.3 and for other applications. An important aspect of the PHY is its spectral efficiency, as this translates directly to cost measured in cost per line or cost per carried bit for FWA systems. With a frequency reuse of one and efficient support of SDMA for increased spectral efficiency, the combination of S-CDMA with FDMA is an optimum technology for the fixed wireless access market.

Benefits of the presently preferred PHY system include:

High spectral efficiency (1–6 bps/Hz system-wide), even without SDMA;

Compatibility with smart antennas (SDMA), with system-wide spectral efficiency exceeding 20 bps/Hz possible; and A frequency reuse of one possible (increased spectral efficiency and no frequency planning).

The use of S-CDMA provides robustness to channel impairments (e.g. multipath fading): robustness to co-channel interference (allows frequency reuse of one); and security from eavesdropping.

Also provided is bandwidth flexibility and efficiency support of QoS requirements, flexibility to support any frequency allocation using a combination of narrowband S-CDMA combined with FDMA, while adaptive coding and modulation yield robustness to channel impairments and traffic asymmetries.

The use of these teachings also enables one to leverage mobile cellular technology for reduced cost and rapid technology development and test. Furthermore, cost savings are realized using the symmetric waveform and identical SS 10 and BS 11 hardware.

Having thus described the overall PHY system, a discussion will now be provided in greater detail of an aspect thereof that is particularly pertinent to the teachings of this invention.

In accordance with a presently preferred embodiment of a channel multiplexing scheme, the above-described communications system allows packet-switched data destined for different users to be multiplexed across multiple CDMA channels, while simultaneously supporting fast circuit-switched data connections to individual users with additional CDMA channels. The amount of bandwidth allocated to each type of service may be arbitrarily adjusted to match the demands of users within the coverage area of each BS 11. In areas where telephony users dominate the bandwidth demand, more bandwidth may be allocated to circuit-switched connections, while in those areas where data users make the greatest demands for bandwidth, more CDMA channels or bandwidth may be allocated to packet-switched type services. The allocation of channel bandwidth may be set during system deployment, and later adjusted by the system operator. Alternately, the bandwidth allocation may be reallocated automatically, in real-time, as demands change.

In the general case, the BS 11 has some maximum system capacity that may be redistributed over a varying number of variable rate CDMA channels. In the case of a clear mode channel all of the BS 11 capacity is realized on a single CDMA channel.

Figure 6:
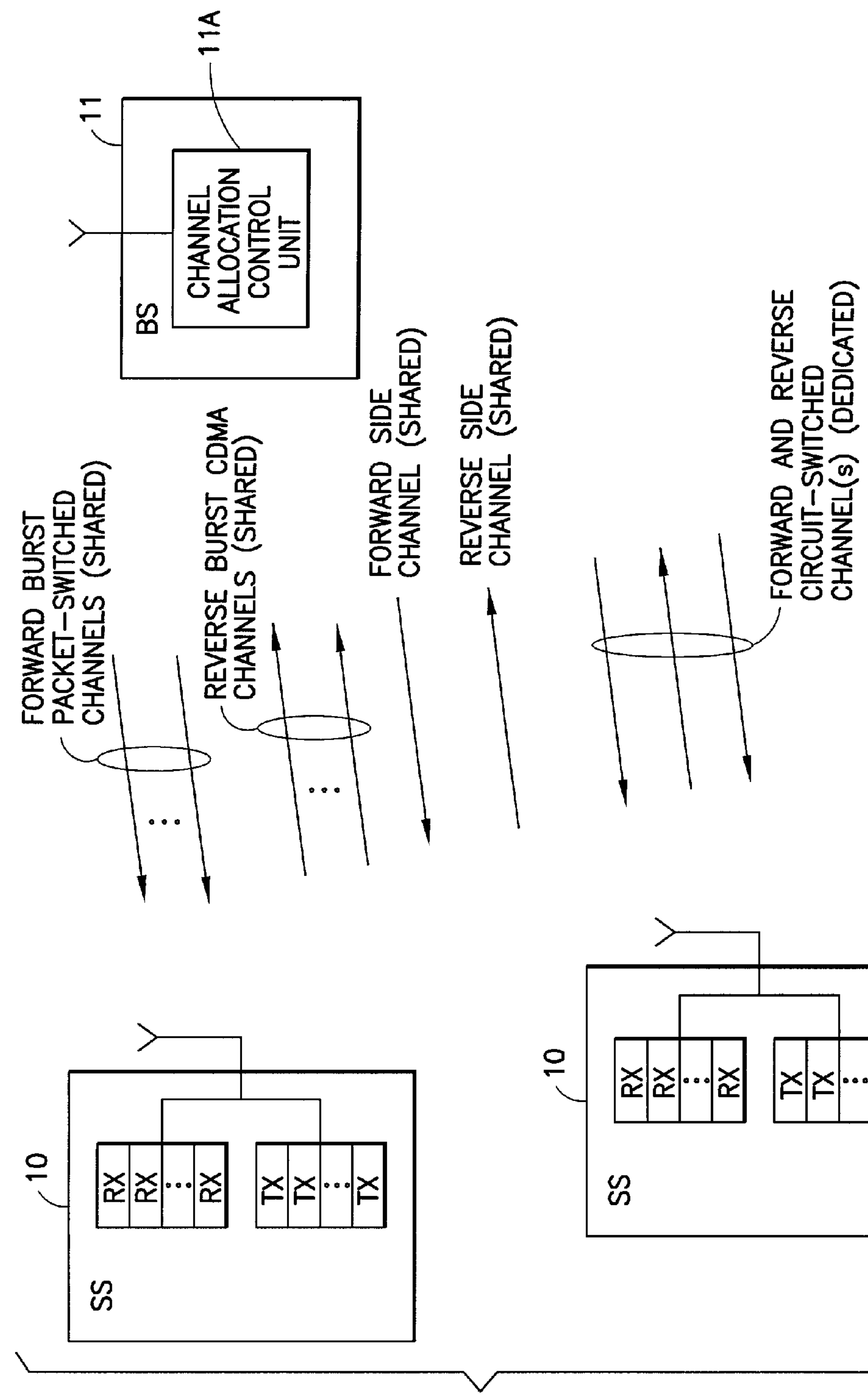
FIG. 6 depicts the flexible use of CDMA channels in accordance with these teachings, in conjunction with a base site channel allocation unit.

As is shown in FIG. 6, the BS 11 includes a channel allocation control unit 11A for implementing the presently preferred bandwidth allocation technique. The presently preferred bandwidth allocation technique allocates a set of CDMA channels for burst packet-switched channels. The data is time division multiplexed (TDM) over the multiple CDMA channels, thereby providing a wide bandwidth data pipe for packet-switched data. Each SS 10 is equipped with multiple CDMA channel receivers (e.g., eight), which are tuned to the set of burst CDMA channels. The remaining CDMA channels are allocated as needed for circuit-switched connections. A plurality of transmitters (e.g., eight) can also be provided. Each channel may use a different spreading code, although this is not required. The total system capacity may be as large as, for example, 512, 32 kbs channels, with adjustments being made to the total number of channels depending on the-rates of the individual channels.

"Fast" circuit switching refers to the fact that the continuous channels can be set up very quickly and torn down very quickly. The fast setup can be achieved by sending the leading portion of the data along with the channel setup request over a dedicated side channel in the reverse or forward links. For example, if a SS 10 subscriber desires to upload a file to a server coupled to the BS 11, the SS 10 sends a request for an active channel on a dedicated side channel. The request generally indicates that the SS 10 requires a dedicated PN code to send data indefinitely, and preferably includes as well the first packet or the first few packets to be sent.

In contrast, if the SS 10 subscriber has a small amount of data, the SS 10 may instead indicate to the BS 11 that the SS 10 has data to be sent, and the data is then attached. That is, the SS 10 indicates that it does not require a dedicated channel, as only a small amount of data is to be conveyed to the BS 11. Thus, the reverse link burst CDMA channels can be used in, by example, a slotted Aloha fashion to send channel requests alone, channel requests along with data, or simply data. Other channel access contention schemes may be used as well.

Similarly, in the forward link multiple SSs 10 may be assigned to the same forward link data side channel. Packet multiplexing is then used to send sparse data packets to the users that the BS 11 knows are listening to that particular packet-switched forward data side channel.

If a large file arrives at the BS 11 that is to be sent to a particular SS 10, then the BS 11 has the option of sending a dedicated channel request command to that SS 10. This has the effect of moving that SS 10 to a dedicated forward link channel that is not shared. In this dedicated (circuit-switched) link, no addressing information is required, since that SS 10 is the only one receiving or listening to the circuit-switched channel. This technique thus conserves forward link bandwidth. When the dedicated channel is no longer required, the dedicated channel can be reassigned to the shared packet-switched forward channels, where the SS 10 may again receive short packets that are small enough to not require the use of a dedicated circuit-switched channel.

While the invention has been particularly shown and described with respect to preferred embodiments thereof, it will be understood by those skilled in the art that changes in form and details may be made therein without departing from the scope and spirit of the invention.

What is claimed is:

1. A synchronous Code Division Multiple Access (CDMA) communication system wherein a base site (BS) communicates with subscriber stations (SSs) through a radio channel, comprising:

a BS channel allocation control unit for allocating radio channel bandwidth to include a set of shared forward link CDMA channels for use as burst packet-switched channels, wherein data is time division multiplexed over the burst packet-switched channels to a plurality of said SSs;

further comprising multiple CDMA burst packet-switched channel receivers at individual ones of said plurality of SSs for receiving said data from said burst packet-switched channels, said BS channel allocation control unit further allocating, as required, other CDMA channels for circuit-switched connections to particular ones of said SSs;

and further comprising a side CDMA channel for making channel requests and for sending all or a part of a total amount of data, depending on the total amount of the data.

2. A synchronous CDMA communication system as in claim 1, wherein for a SS that has data to transmit to the BS, the SS transmits an indication to the BS that the SS has data to be transmitted, along with the data.

3. A synchronous CDMA communication system as in claim 1, wherein said BS channel allocation control unit further allocates a set of shared reverse link CDMA channels for use as reverse burst packet-switched channels that are used in a contention mode by a number of said SSs.

4. A synchronous CDMA communication system as in claim 1, wherein said BS channel allocation control unit further allocates a set of shared reverse link CDMA channels for use as reverse burst packet-switched channels that are used in a slotted Aloha fashion by a number of said SSs.

5. A synchronous CDMA communication system as in claim 1, wherein said BS channel allocation control unit further allocates a set of shared reverse link CDMA channels for use as reverse burst packet-switched channels, and wherein individual ones of said S Ss further comprise multiple CDMA burst packet-switched channel transmitters that are used in a contention mode by a number of said SSs to transmit channel requests alone, channel requests along with data, or data alone to said BS.

6. A synchronous CDMA communication system as in claim 1, wherein at least two of said SSs are assigned to a same forward link data side channel, and where packet multiplexing is used to transmit data packets from the BS to individual ones of at least two of said SSs.

7. A synchronous CDMA communication system as in claim 1, wherein said BS channel allocation control unit allocates said radio channel bandwidth under control of a network operator.

8. A synchronous CDMA communication system as in claim 1, wherein said BS channel allocation control unit allocates said radio channel bandwidth automatically in response to demand.

* * * * *